Patented Aug. 5, 1952

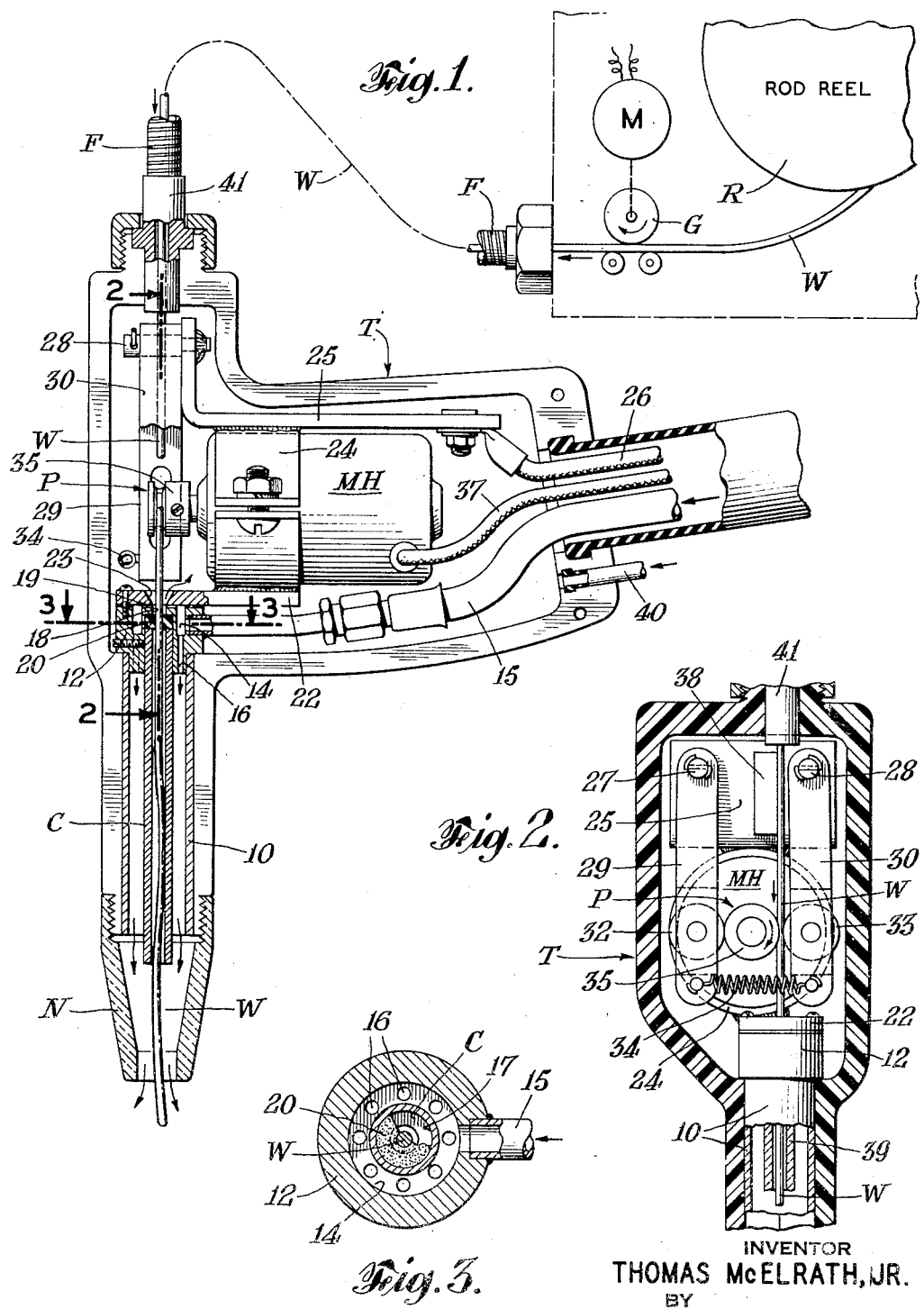

2,606,267

UNITED STATES PATENT OFFICE 2,606,267

GAS BLANKETED METAL ARC WELDING

Thomas McElrath, Jr., Chatham, N. J., assignor, by mesne assignments, to Union Carbide and Carbon Corporation, a corporation of New York Application February 12, 1949, Serial No. 76,063

9 Claims. (Cl. 219—8)

This invention relates to gas blanketed metal arc welding of difficult-to-weld metals, and more particularly to method and apparatus for this purpose which employs a fusible wire of similar metal to constitute the electrode, and provides an inert gas to blanket the arc and molten portions of the wire and work.

The wire which forms the electrode and which also supplies the filler metal is consumed in the process, and must be fed into the arc during the welding operation. This is done by nip rollers which apply a longitudinal thrust to the wire to unwind it from a reel and advance it toward the welding zone as the end of the wire is progressively fused and deposited at the welding zone. Electric welding current is supplied to the moving wire by a contact tube through which the wire passes on its way to the arc. With this expedient there is the difficulty that the wire tends to jam in its path from the nip rollers to and through the contact tube, and stop the feeding operation. This causes the wire to weld itself to the contact tube, which requires the tube to be removed and replaced in order to continue the welding operation.

The main object of the present invention is to avoid the difficulty referred to above, and to apply the longitudinal thrust to the wire at a point close to the arc. Other objects are to facilitate the operation and improve the apparatus for welding of this character.

Other objects and features of novelty will be apparent from the following description and the accompanying drawings, in which Fig. 1 is a longitudinal section through apparatus according to and for carrying out the method of the present invention;

Fig. 2 is a section taken along the line 2—2 of Fig. 1; and

Fig. 3 is a section taken along the line 3—3 of Fig. 1.

According to the present invention, the gas blanketed metal arc welding of difficult-to-weld metals such as aluminum, stainless steel, copper and bronzes, comprises passing an electric welding current of high current density between the work and a progressively fusible wire of similar metal at a contact point on said wire spaced from its tip to maintain an arc between said tip and work, passing an annular stream containing essentially inert gas such as helium or argon along said wire and through an annular nozzle between said contact point and said tip to blanket the arc and molten portions of said wire and work, and during the welding operation applying longitudinal thrust to said wire at a point adjacent said contact point and adjacent said nozzle to advance said wire past said contact point and axially through said nozzle and gas stream into the arc.

As shown in the drawing, the wire W is supplied by a reel R from which it is unwound by nip rollers G which feed the wire through a flexible tube F to a torch T. Inside the torch T is a contact tube C which supplies electric welding current to the moving wire. A nozzle N is mounted on the torch for directing an annular stream of inert gas along the wire and out of the nozzle to blanket the arc.

Inside the torch T and close to the contact tube C are mounted nip rollers P driven by a motor MH in the handle of the torch. These nip rollers P apply longitudinal thrust to the wire at a point close to the point of supply of electric welding current thereto.

In the form shown the torch T is a hand manipulated welding gun which comprises a barrel 10 mounted on a header 12 in concentric relation with the contact tube C. As shown in Fig. 3, the header 12 has an annular chamber 14 which receives inert gas such as argon or helium from a tube 15 passing through the handle. The chamber 14 distributes the gas through holes 16 spaced around the header 12 and discharging into the barrel 10 outside of the contact tube C.

The gun is formed of a suitable plastic in which the barrel 10 and header 12 are fitted or embedded, and the nozzle N is threaded onto the plastic surrounding the barrel 10 and extends therebeyond in concentric relation therewith to direct gas from the barrel 10 along the wire to blanket the arc.

The header 12 has a central bore 17 which receives the contact tube C and a smaller counterbore 18 through which the wire is admitted. A sealing washer 20 of rubber or other gasket or stuffing material is filled in the bore 17, to prevent the admission of air along with the incoming wire.

Secured to the rear wall of the header 12 is a hanger 22 having an aperture 23 registering with the counterbore 18. The central portion of the header 12 is spaced from the hanger 22 leaving a radial passage 19 from the chamber 14 to the aperture 23. The inert gas in the chamber 14 is under superatmospheric pressure, which maintains a back pressure or pressurized condition to force a small quantity of inert gas out through the aperture 23, to insure that no air or moisture can enter the gas blanketed portion of the torch and so contaminate the weld.

In lieu of, or in addition to, this pressurized arrangement, the entire gun body may be pressurized by a separate supply of inert gas through a tube 40. The gun body T is made gas tight, and a small quantity of inert gas from the gas filled interior of the gun body passes out through the aperture in the fitting 41 around the incoming wire W.

The hanger 22 supports a motor clamp 24 for the motor MH. A bracket 25 is secured to the motor clamp 24, and is connected to a lead in cable 26 which supplies electric welding current through the bracket 25, motor clamp 24, header 12, and contact tube C to the wire W.

The bracket 25 supports a pair of pivot pins 27 and 28 on which are pivoted levers 29 and 30 respectively journaling backing rollers 32 and 33. The ends of the levers 29 and 30 beyond the rollers are connected by a tension spring 34. The shaft of the motor MH has keyed thereon a drive roller 35, and the rollers 33 and 35 are grooved to receive the wire W therebetween. The backing roller 32 bears against the opposite side of the roller 35, to balance the side pressure of the roller 33 and prevent such side pressure on the motor shaft. The motor MH is energized by current supplied by a cable 37.

In the form shown in Fig. 1, there are two other paths for the welding current, in addition to the preferred path through the contact sleeve C. When the motor MH is not insulated, the welding current from the lead-in 26 passes through bracket 25, motor clamp 24, the motor armature shaft, and roller 35 to the wire W. Also when the pins 27 and 28 are not insulated, felding current from the lead-in 26 passes through bracket 25, pins 27 and 28, levers 29 and 30, and rollers 33 and 32 and 35 to the wire W. Depending upon the insulation, the welding current may take any one, any two or all three of these paths.

In the form shown in Fig. 2, a contact shoe 38 is mounted on the bracket 25 to supply welding current from the lead-in 26 to the moving wire W. With this arrangement, the pins 27 and 28 and the motor MH and the header 12 are insulated electrically, so that the welding current is supplied by the shoe 38 ahead of the roller 35 which supplies the longitudinal thrust to the wire. In lieu of the contact sleeve C, a guide tube 39 is provided, which is constructed of electrically insulating material, such as ceramic or plastic, which is also heat resistant. This arrangement avoids any welding of the wire W to the guide sleeve 39.

In operation, inert gas being supplied by the tube 15, the motor M being energized, and electric welding current being supplied by the cable 26, the torch T is positioned to direct the wire against the work to strike the arc, and the torch is moved along the line of weld at from less than 24 to more than 30 inches per minute. The wire feed, current density, and gas flow are proportional to the diameter of the wire over ranges of the order of between 150 inches of wire and 8 liters of gas per minute at 135 amperes to more than 250 inches of wire and 10 liters of gas per minute at more than 240 amperes for a one-sixteenth inch wire, and between 70 inches of wire and 15 liters of gas per minute at 275 amperes to more than 150 inches of wire and 20 liters of gas per minute at more than 500 amperes for a one-eighth inch wire.

I claim:

1. Gas blanketed metal arc welding of metals which comprises passing an electric welding current of high current density between the work and a fusible metal wire at a contact point on said wire spaced from its tip to maintain an arc between said tip and work, passing an annular stream containing essentially inert gas along said wire and through an annular nozzle between said contact point and said tip to blanket the arc and molten portions of said wire and work, feeding said wire through a conduit toward said contact point, and during the welding operation applying longitudinal thrust to said wire at a point between said conduit and said contact point to advance said wire past said contact point and axially through said nozzle and gas stream into the arc while maintaining the wire feed and current density and gas flow at a rate proportional to the range from 150 inches and 8 liters per minute at 135 amperes to more than 250 inches and 10 liters per minute at 240 amperes for a one-sixteenth inch wire, and from 70 inches per minute at 275 amperes to 150 inches and 20 liters per minute at 500 amperes for a one-eighth inch wire.

2. Gas blanketed metal arc welding of aluminum and its alloys, which comprises passing a direct current reverse polarity electric welding current of high current density between the work and a wire of the same metal at a contact point spaced from its tip to maintain an arc between said tip and work, passing an annular stream containing essentially inert gas along said wire and through an annular nozzle between said point and tip to blanket the arc and molten portions of said wire and the work, feeding said wire through a conduit toward said contact point, and during the welding operation, applying longitudinal thrust to said wire at a point between said conduit and said contact point to advance said wire past said contact point and axially through said nozzle and gas stream into the arc while maintaining the wire feed and current density and gas flow within the range of the order of between 150 inches and 8 liters per minute at 135 amperes to more than 250 inches and 10 liters per minute at 240 amperes for a one-sixteenth inch wire, and between 70 inches and 15 liters per minute at 275 amperes to more than 150 inches and 20 liters per minute at 500 amperes for a one-eighth inch wire.

3. Apparatus for gas blanketed metal arc welding of metals, which comprises means for passing an electric welding current between the work and a wire of similar metal at a contact point on said wire spaced from its tip to maintain an arc between said tip and work, means for passing an annular stream containing essentially inert gas along said wire and through an annular nozzle between said point and said tip to blanket the arc and molten portions of said wire and work, a reel, a conduit, means for feeding said wire from said reel through said conduit, and means operative during the welding operation for applying longitudinal thrust to said wire at a point between said conduit and said contact point to advance said wire past said contact point and axially through said nozzle and gas stream into the arc.

4. Apparatus for gas blanketed metal arc welding of metals which comprises an electric welding circuit between the work and a wire of similar metal at a contact shoe engaging the wire at a point along the path of said wire spaced from its tip to maintain an arc between said tip and work, a nozzle between said contact shoe and said tip, means for passing an annular stream containing essentially inert gas along said wire and through said nozzle to blanket the arc and molten portions of said wire and work, a reel, a conduit, means for feeding said wire from said reel through said conduit, a gripping device engaging said wire at a point between said conduit and said contact shoe and means for driving said gripping device for applying longitudinal thrust to said wire to advance said wire past said contact shoe and axially through said nozzle and gas stream into the arc.

5. Apparatus for gas blanketed arc welding of metals, which comprises an electrically conductive tube through which a wire of the same metal as that being welded passes, means for passing electric welding current through said tube and wire and the work to maintain an arc, a nozzle, means for passing an annular stream containing essentially inert gas through said nozzle and along said wire to blanket the arc and molten portions of said wire and work, a reel, a conduit, means for feeding said wire from said reel through said conduit and a gripping device engaging said wire at a point between said conduit and said tube, and means for driving said gripping device for applying longitudinal thrust to said wire to advance said wire through said tube, nozzle and gas stream into the arc.

6. A gas blanketed metal arc welding gun having a barrel, an electrically conductive tube inside said barrel adapted to slidably receive a long electrode wire, a gas confining nozzle mounted on said gun outside of said tube and extending therebeyond toward the arc to form an orifice, means for supplying electric welding current through said tube to the electrode wire passing therethrough, a reel, a flexible conduit secured to said gun, means for feeding said wire from said reel through said flexible conduit to said gun, wire engaging means in said gun for feeding said wire from said flexible conduit through said tube, a motor in said handle for driving said feeding means, and means for supplying inert gas to said nozzle to flow along the electrode and blanket the arc.

7. Gas blanketed metal arc welding of metals which comprises passing an electric welding current between the work and a fusible metal wire at a contact point on said wire spaced from its tip to maintain an arc between said tip and work while progressively fusing said wire, passing an annular stream containing essentially inert gas along said wire and through an annular nozzle between said point and said tip to blanket the arc and molten portions of the work, applying longitudinal thrust to said wire to advance said wire past said contact point and axially through said nozzle and gas stream into the arc, and maintaining a zone of gas containing essentially inert gas under superatmospheric pressure surrounding the incoming wire to prevent entrance of air therewith into said annular stream.

8. Apparatus for gas blanketed arc welding of metals, which comprises means for passing an electric welding current between the work and an electrode to maintain an arc between said electrode and said work, means for passing a stream containing inert gas to surround the electrode and shield the arc, a reel, a flexible conduit, means for feeding wire from said reel through said flexible conduit, and means operative during the welding operation for applying longitudinal thrust to said wire at a point between the discharge end of said flexible conduit and said arc, for pulling the wire out of said flexible conduit and advancing it toward the arc.

9. Apparatus for gas shielded electric arc welding of metals with an electrode held in a portable hand gun to be held by the operator, comprising means for supplying a stream containing inert gaseous medium to shield the arc between the electrode and a workpiece, a wire supply reel, a flexible conduit receiving wire from said reel, a wire guide receiving wire from said flexible conduit and directing it toward the arc, feed rollers carried by said gun engaging said wire between the discharge end of said flexible conduit and said wire guide, and means for driving said rollers for pulling the wire out of said flexible conduit and pushing it through said wire guide toward the arc.

THOMAS McELRATH, Jr.

REFERENCES CITED

The following references are of record in the file of this patent:

UNITED STATES PATENTS

| Number | Name | Date |
| --- | --- | --- |
| 1,508,689 | Glasser | Sept. 16, 1924 |
| 1,508,691 | Glasser | Sept. 16, 1924 |
| 1,746,207 | Alexander | Feb. 4, 1930 |
| 2,121,693 | Henderson | June 21, 1938 |
| 2,504,868 | Muller et al. | Apr. 18, 1950 |

FOREIGN PATENTS

| Number | Country | Date |
| --- | --- | --- |
| 626,550 | France | May 14, 1927 |